United States Patent [19]

Yamamoto

[11] 4,001,893

[45] Jan. 4, 1977

[54] PORTABLE TAPE-RECORDER
[75] Inventor: Kozo Yamamoto, Hirakata, Japan
[73] Assignee: Matsushita Electric Industrial Co., Ltd., Kadoma, Japan
[22] Filed: Oct. 4, 1974
[21] Appl. No.: 512,299
[30] Foreign Application Priority Data Oct. 12, 1973 Japan .......................... 48-119306
Oct. 12, 1973 Japan .......................... 48-119307
Oct. 12, 1973 Japan .......................... 48-119308
Oct. 12, 1973 Japan .......................... 48-119309

[52] U.S. Cl. .......................... 360/137; 179/1 MF; 181/155
[51] Int. Cl.² .......................... G11B 1/04
[58] Field of Search .... 360/137; 179/1 MF, 100.12 A; 181/155; 274/2; 312/7, 8; D26/14 B; D56/4 R

[56] References Cited
UNITED STATES PATENTS

| 1,786,279 | 12/1930 | Wolff | 181/155 |
| 2,717,046 | 8/1955 | Liebert | 181/155 |
| 3,485,963 | 12/1969 | Murata | 360/137 |

FOREIGN PATENTS OR APPLICATIONS

| 6,397 | 8/1901 | Austria | 179/1 MF |

Primary Examiner—James W. Moffitt
Attorney, Agent, or Firm—Cushman, Darby & Cushman

[57] ABSTRACT

A sound-reflector, for instance a tilted plate, is set over a microphone on the top face of a chest-pocket size small tape-recorder, so that voice of a person who is talking to the person who carries the tape-recorder is reflected to effectively reach the microphone provided on the top face. By means of the sound-reflector, both the voice of the tape-recorder carrying person and the voice of his companion are recorded with more even levels in comparison with recordings by conventional chest-pocket type tape-recorders without such a sound-reflector.

2 Claims, 10 Drawing Figures

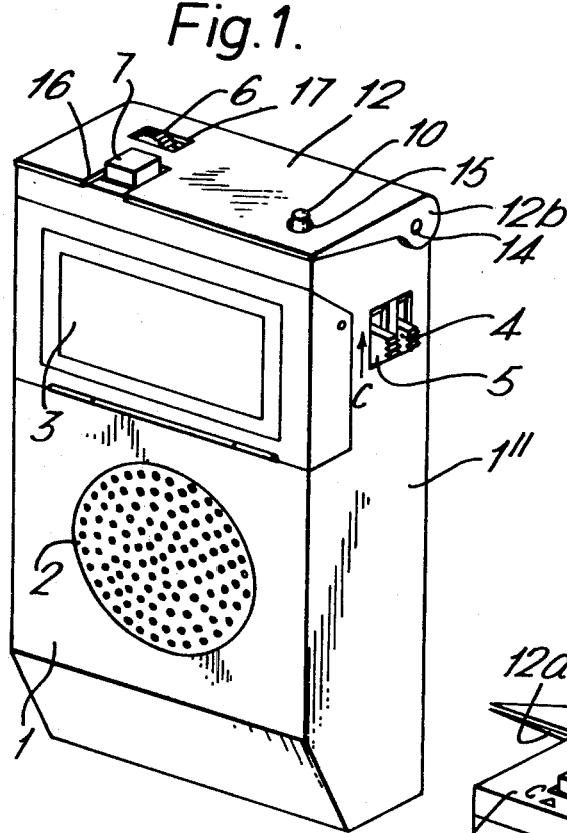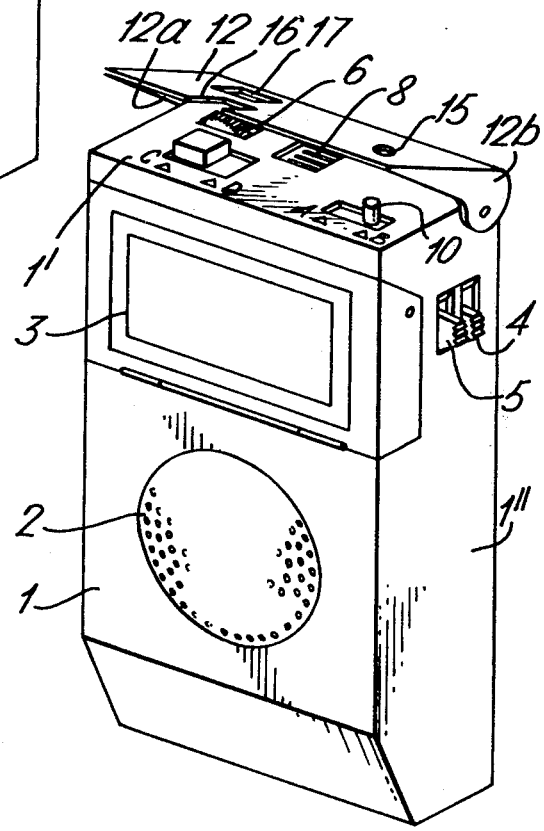

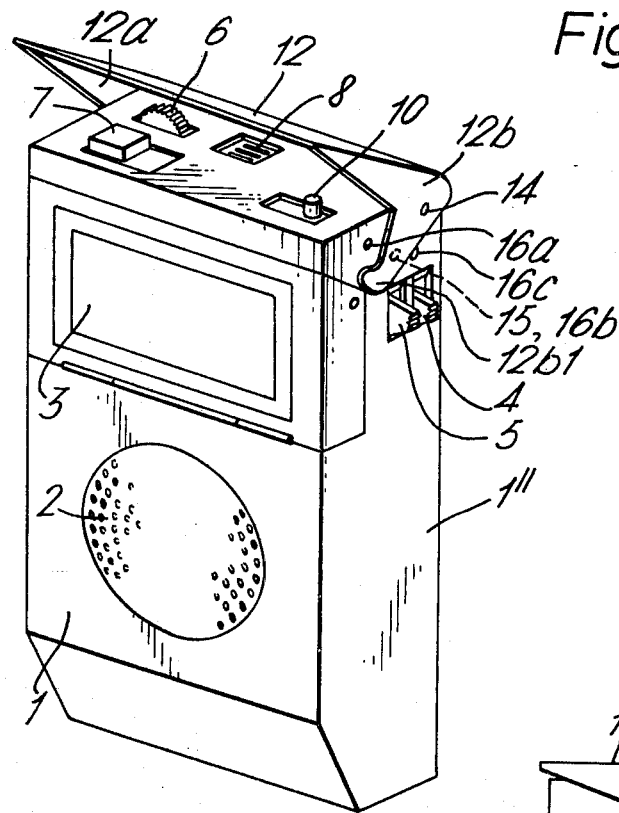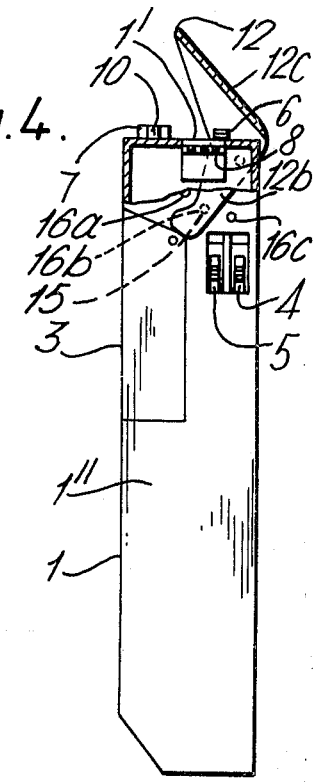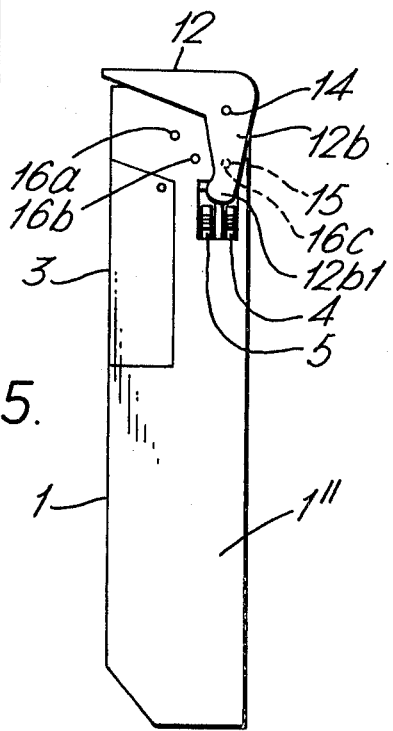

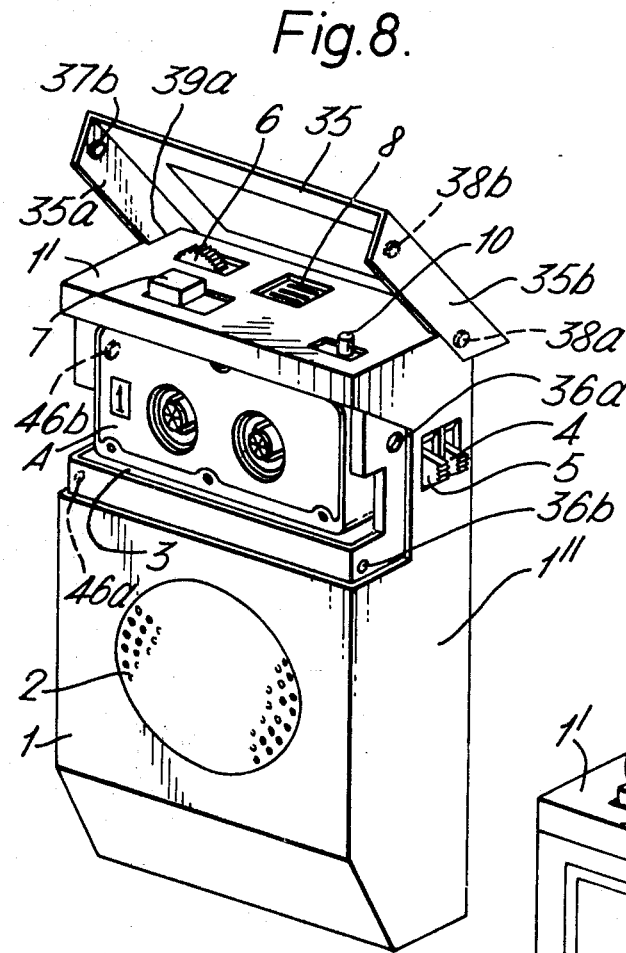
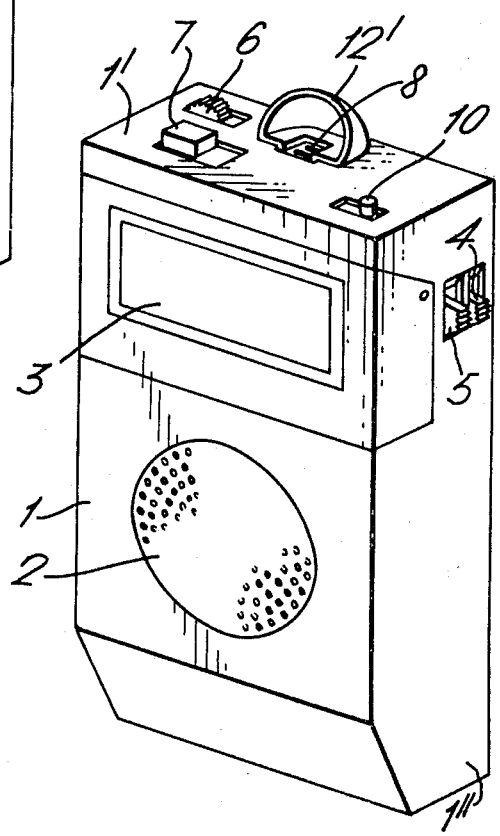
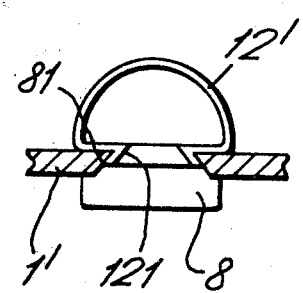

PORTABLE TAPE-RECORDER

BACKGROUND OF THE INVENTION

This invention relates to an improvement of vest-pocket size portable tape recorders.

Technical advances have resulted in very small-sized portable tape-recorders capable of being held in a vest-pocket or chest pocket. However, in the conventional pocket-type tape-recorder, a microphone is placed in its narrow top part, and therefore, when put in a chest pocket, the microphone faces toward the mouth of the person carrying it and not toward the person talking to the carrier of the tape recorder. Moreover, in an actual recording of a conversation, the distance between the microphone and the mouth of the carrying person is by far shorter than the distance between the microphone and the mouth of the other person. Consequently, such tape recorder usually records the carrying person's voice at a higher decifel level, while it records the other person's voice at a much lower decifel level. However, for the purpose of making a good recording of a conversation or conference, both voices of the carrier and the other persons should be recorded at even decifel levels.

SUMMARY OF THE INVENTION

This invention provides a chest-pocket type tape recorder capable of recording the voices of the carrier and the other person at even decifel levels.

BRIEF EXPLANATION OF DRAWING

FIG. 1 is a perspective view of a first embodiment with its sound reflector 12 closed, FIG. 2 is a perspective view of the first embodiment with the sound reflector 12 open, FIG. 3 is a perspective view of a second embodiment with its sound reflector 12 open, FIG. 4 is a partly fragmental side view of the second embodiment with the sound reflector 12 open, FIG. 5 is the side view of the second embodiment with the sound reflector 12 closed, FIG. 8 is a perspective view of the third embodiment with the cassette cover 35 placed over the top of the box, FIG. 9 is a perspective view of a fourth embodiment, and FIG. 10 is an enlarged sectional front view of the top part of the fourth embodiment.

DETAILED DESCLOSURE OF THE INVENTION

Figure 6:
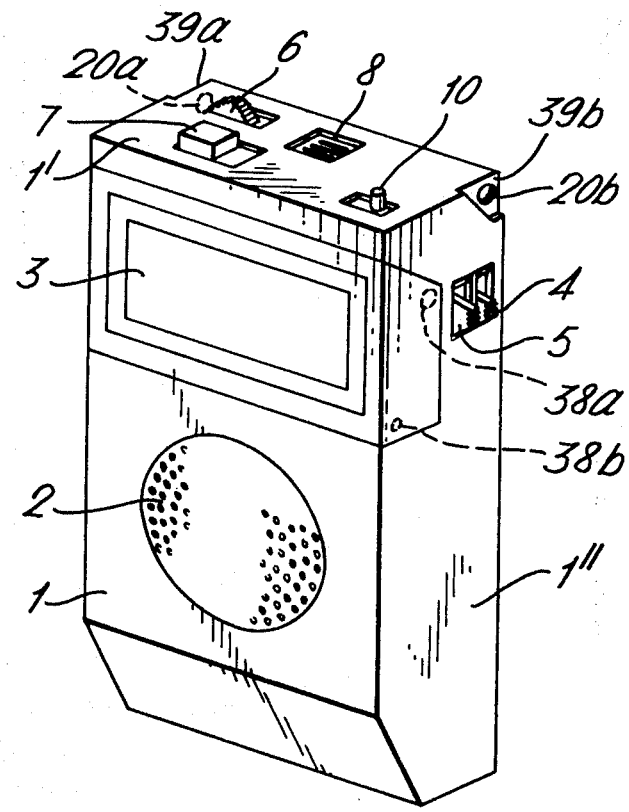
FIG. 6 is a perspective view of a third embodiment with its cassette cover 35.

In an example of FIGS. 1 and 2, a box of a chest-pocket type tape-recorder is shaped in a flat box 1 and has a microphone 8 and many controlling knobs provided on its smallest face, i.e., top face 1', a cassette cover 3 and a speaker 2 on its largest face, i.e., front face. Sliding knobs 4 and 5 on the side face 1" are for playing and recording, respectively. A rotary knob 6 on the top face is for controlling the sound volume. A sliding knob 7 on the top face is for rewinding and fast forward running. Another sliding knob 10 is for pausing, which controls the running of the tape in recording or playing operation, in a manner that the tape pauses when the knob 10 is in a position indicated by mark B. In the tape-recorder, a pinch-roller made of rubber of similar elastic material keeps on touching a capstan when the knob 10 is at the pause position B, and furthermore, the electronic circuit of the tape-recorder is electrified and stands by.

A sound reflector 12 is movably attached to the top face of the box, being hinged through its bent tabs 12a and 12b at its both ends by pins 14, 14 fixed to the upper parts of both side faces of the box. The hinging is arranged in such a manner that the sound-reflector 12 can be stopped both at tilted open position at any angle of opening against the top face as shown in FIG. 2 and at closed position shown in FIG. 1, by means of friction. The sound reflector 12 has a hole or indent 15 for accomodating the knob 10 at its resting (inoperative) position marked by A.

Namely, the sound reflector 12 can be closed only when the knob 10 is at the reset (inoperative) position apart from the pausing position B. The sound reflector 12 has another indent or hole 16 for acomodating the knob 7 at its reset (inoperative) position marked by C apart from the rewinding and fast-forwarding position marked by D. Also the sound-reflector 12 has a slot 17 for exposing the volume control knob 6 therefrom.

Operation of the example of FIGS. 1 & 2:

When the tape-recorder is in the completely reset (inoperative) state, the sound reflector 12 is closed as shown in FIG. 1, where the knob 7 in resting (inoperative) position C is exposed through the indent 16 and the knob 10 in resting (inoperative) position A is exposed through the hole 15. For recording a conversation between the carrier of the tape-recorder and his converser while holding the taperecorder in the carrier's chest-pocket, the sound-reflector 12 is raised in a tilted position to have an angle of about 45° against the top face of the box 1 as shown in FIG. 2, in which state both knobs 7 and 10 can be freely moved to their positions D and B, respectively. In this state with the sound-reflector 12 opened at about 45°, the voice of the carrier of this tape-recorder is suitably attenuated toward the microphone 8, while the voice of his converser talking to him is caught by the sound-reflector 12 and is effectively reflected to the microphone 8. Therefore, both voices can be recorded in more even levels in comparison with the conventional recording without a sound-reflector.

When either of the knobs 7 and 10 is not in the resting (inoperative) position, if the operator of this tape-recorder inadvertenly tries to close the sound-reflector 12 to its closed position under misconception that both knobs 7 and 10 were in reset (inoperative) positions, and the tape-recorder were entirely put off, then the knob 7 or 10, that is not in reset (inoperative) position, clash against back face of the sound-reflector 12, preventing it from being closed and reminding the operator to reset the knob 7 or 10 for putting off the tape-recorder. Therefore, such troubles as the tape-recorder being left with its electric circuit kept electrified or with the pinch-roller touching the capstan causing a permanent distortion of the pinch-roller can be avoided.

In an example of FIGS. 3 to 5 and in further examples hereinafter, the parts corresponding to those of the previous examples are designated with the same symbols and numerals.

In the example of FIGS. 3 to 5, sound reflector 12 is movably attached to the top face of the box, being hinged through side tabs 12a and 12b to both side faces of the box by pins 14,14. Each side tab has a small dent 15 which is to fit small recesses 16a, 16b and 16c, on both side faces of the box, respectively, when the sound reflector 12 is fully opened (in the right angle to the top face of the box), when half opened (tilted in about 45° angle to the top face of the box) and when closed on the top face. Furthermore, each side tab 12b has an interlocking lever part 12b1 which is an extension of the side tab 12b. The interlocking lever part 12b1 is so situated as to interlock the playing knob 4 and recording knob 5, in a manner that with either of these knobs at setting position (i.e., playing position or recording position), the sound reflector 12 can not be closed on the top face. Therefore, the sound reflector 12 can be closed to cover the top face of the box only when the playing knob 4 and the recording knob 5 are in their resting (inoperative) position.

Operation of the example of FIGS. 3 to 5:

When the tape-recorder is completely in reset (inoperative) state, the sound reflector 12 is closed as shown in FIG. 5, where the knobs 4 and 5 are in their reset (inoperative) positions (namely in the lower position). For recording conversation between the carrier of this tape-recorder and his converser while holding the tape-recorder in the carrier's chest-pocket, the sound-reflector 12 is raised to an angle of about 45° against the top face of the box 1 with its detent 15 fitting in the indent 16b as shown in FIGS. 3 and 4, and in this state, both the playing knob 4 and the recording knob 5 can freely move to their playing position and recording position (upper positions). In this state with the sound-reflector 12 opened at about 45°, the voice of the carrier of this tape-recorder is suitably attenuated and the voice of his converser is effectively caught by the microphone 8. Therefore, both voices can be recorded in fairly even levels.

When either of the knobs 4 and 5 is not in reset (inoperative) position, if the operator of this tape-recorder inadvertently tries to close the sound-reflector 12 to its reset (inoperative) position under misconception that the knobs 4 and 5 were in reset (inoperative) position, and the tape-recorder were entirely put off, then the knob 4 or 5, which is not in reset (inoperative) position, hinders the tab extension 12b1 from being brought to its resting, (inoperative) position corresponding to closing of the sound-reflector 12, so that the reflector is not closed, and reminds the operator to reset the knobs 4 or 5 for putting off the tape-recorder. Therefore, useless wasting of electric power as well as harmful effects on the circuit, pinch rollers, etc. can be avoided.

Moreover, the sound reflector 12 serves also to protect the knobs 7, 10 and 6 on the top face from possible clash.

The hole or indent as in the example of FIGS. 3 to 5 can be formed together with the extended interlocking lever 12b1, so that both parts should work together.

Figure 7:
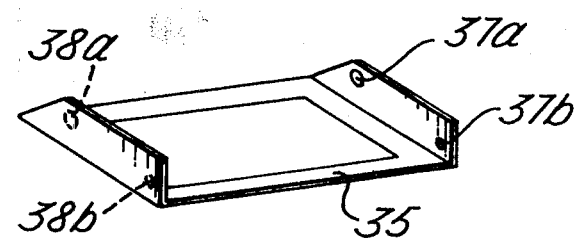

In an example of FIGS. 6 to 8, a detachable cover 35 is provided to cover the cassette holding part 3. Detents 37b and 38b are provided on the inner side of the bent parts 35a and 35b of the cover 35. The dents 37b and 38b fit in the recesses 36b and 46a, respectively, by means of resilience of the cover 35, so that the cover 35 can be moved for shutting (as shown in FIG. 6) and opening around the fitted dents and recesses. The low dents 38a and 37a engage with shallow recesses 36a and 46b so as to keep the cover closed. The cover 35 can be detached from the box 1 by disengaging the fitting between dents and recesses by strongly pulling the cover 35 from the box, and then the cover 35 can be obliquely set over the top face of the box 1, by means of fitting the dents 38a and 37a in the holes 20b and 20a provided on the recessed faces 39b and 39a, respectively. Brims of the recessed faces 20b and 20a define the inclination of the cover 35 against the top face. The obliquely set cover 35 then serves as a sound reflector.

Operation: A playing of the recorded tape can be made with the cover 35 set to cover the cassette holding part 3. In order to record a conversation between the tape-recorder carrier and his converser, it is recommended to detach the cover 35 from the cassettte holding part 3 and to set it over the top face with an oblique angle, so that the converser's voice is reflected by the cover 35 and effectively arrives into the microphone 8 while the carrier's voice is suitably attenuated by the cover 3, thus enabling to record both voices of the carrier and the converser in about even levels.

In an example of FIGS. 9 to 10, a detachable quaterspherical sound-reflector 12' is provided over the microphone on the top face 1'. The sound reflector 12' has an engaging skirt 121 around its sound conducting indent in the lower center part, so that by means of elasticity of the sound-reflector 12'. the engaging skirt 121 engages with brim part 81 of a microphone opening in the top face 1', to secure the sound-reflector 12' on the top face. The sound-reflector 12' can be easily removed by pulling off, when recording is over.

Operation: In order to record a conversation between the tape-recorder carrier and his converser, it is recommended to attach the sound-reflector 12' over the microphone opening, so that the converser's voice is reflected by the sound-reflector 12' and effectively comes into the microphone 8 while the carrier's voice is appropriately attenuated by the reflector 12', thus enabling to record both voices of the carrier and the converser in about even levels.

What is claimed is:

1. A chest-pocket type tape-recorder having a microphone on a narrow top face thereof, characterized in that a movable sound reflector for reflecting sounds from the front direction to the microphone is attached over the microphone, the narrow top face of the tape-recorder having a pause knob having an inoperative position separate from a pause position and a rewind-and-fast-forward knob having an inoperative position separate from a rewind-and-fast-forward position, said movable sound reflector being hinged to the top face in a manner that the sound reflector can be held in tilted position for sound reflection, and the sound reflector having dents or holes which, in the closed position, interlocks both the pause knob and the rewind-and-fast-forward knob in their inoperative positions.

2. A chest-pocket type tape-recorder having a microphone on a narrow top face thereof, characterized in that a movable sound reflector for reflecting sounds from the front direction to the microphone is attached over the microphone, a side face of the tape-recorder having a playing knob having an inoperative position separate from a playing position and a recording knob having an inoperative position separate from a recording position, said movable sound reflector being hinged to the top face in a manner that the sound reflector can be held in tilted position for sound reflection, and the sound reflector having an interlocking lever on the side face in a manner that in the closed position of the sound reflector the interlocking lever interlocks the playing knob and the recording knob in their inoperative positions.

* * * * *